United States Patent [19]

Marchant

[11] Patent Number: 5,218,582
[45] Date of Patent: Jun. 8, 1993

[54] MAGNETO-OPTIC READOUT USING A POLARIZATION-PRESERVING OPTICAL GUIDE

[75] Inventor: Alan B. Marchant, Fairport, N.Y.

[73] Assignee: Eastman Kodak Company, Rochester, N.Y.

[21] Appl. No.: 836,194

[22] Filed: Feb. 13, 1992

Related U.S. Application Data

[63] Continuation of Ser. No. 620,802, Dec. 3, 1990, abandoned.

[51] Int. Cl.$^5$ .......................... G11B 13/00; G11B 7/13
[52] U.S. Cl. ........................................ 369/14; 369/13; 369/110; 369/112
[58] Field of Search .................... 369/13, 14, 15, 110, 369/112; 360/59, 114; 250/201.2, 201.5, 227.11, 227.15

[56] References Cited

U.S. PATENT DOCUMENTS

| | | | |
|---|---|---|---|
| 4,626,679 | 12/1986 | Kuwayama et al. | 250/227 |
| 4,700,336 | 10/1982 | Yoshida et al. | 369/110 |
| 4,721,368 | 1/1988 | Deguchi et al. | 369/110 |
| 4,729,122 | 3/1988 | Itoh | 369/13 |
| 4,792,866 | 1/1989 | Yoshikawa | 369/110 |
| 4,858,218 | 8/1989 | Takagi et al. | 369/13 |
| 4,873,678 | 10/1989 | Nakamura et al. | 369/110 |
| 4,894,815 | 1/1990 | Yamanaka | 369/13 |
| 4,918,675 | 4/1990 | Lee | 369/13 |

FOREIGN PATENT DOCUMENTS

| | | | |
|---|---|---|---|
| 0346844 | 12/1989 | European Pat. Off. | 369/112 |
| 0285263 | 12/1987 | Japan | 360/114 |

OTHER PUBLICATIONS

IBM Technical Disclosure Bulletin vol. 33 No. 113 Jun. 1990 pp. 250-253 "Efficient M/O Read/Write Head Using Faraday Rotators".

Primary Examiner—Eugene R. LaRoche
Assistant Examiner—Tan Nguyen
Attorney, Agent, or Firm—William W. Holloway

[57] ABSTRACT

Apparatus for reading out information magneto-optically recorded in a magnetic layer comprises a single, polarization-preserving optical guide (e.g., an optical fiber or two-dimensional waveguide) for transmitting plane-polarized read-out radiation to the recording layer, as well as for transmitting such radiation, upon being reflected by the recording layer, toward a photodetector. Either the TE or TM axis of the optical guide is initially aligned with the plane of polarization of the readout source. A polarization rotator, such as a Faraday rotator, is positioned between the output end of the optical guide and the recording medium. The Faraday rotator serves to rotate the plane of polarization of the readout radiation by a total of 45 degrees, whereby the optical guide transmits reflected light in both TE and TM modes equally. A pair of photodiodes cooperate with a polarizing beam splitter to differentially detect the Kerr rotation angles ($\pm\Theta_k$) produced by the up-/down orientation of the vertically oriented magnetic domains in the recording layer.

5 Claims, 2 Drawing Sheets

MAGNETO-OPTIC READOUT USING A POLARIZATION-PRESERVING OPTICAL GUIDE

This is a continuation of application Ser. No. 620,802, filed Dec. 3, 1990 abandoned.

BACKGROUND OF THE INVENTION

The present invention relates to the field of magneto-optic recording and playback. More particularly, it relates to improvements in apparatus for playing back digital information which has been previously recorded in a magneto-optic (M-O) recording element.

The method of optically reading magnetically recorded digital information by use of the magneto-optic Kerr effect is well known. Such method basically involves the steps of scan-irradiating the recording element with a continuous-wave beam of plane-polarized radiation (e.g. emanating from a c-w laser), and detecting small clockwise or counterclockwise rotations, typically on the order of 2 degrees or less, in the plane of polarization of the reflected beam. The direction of such rotation is determined by the orientation (either up or down) of the irradiated, vertically-oriented magnetic domains representing the recorded information.

A conventional M-O recording element comprises a relatively thick (e.g. 1.2 millimeters) transparent substrate which supports a relatively thin (e.g. 100 nanometers) layer of magneto-optic recording media. The magneto-optic layer may comprise any one of a variety of compounds which exhibits a relatively strong Kerr effect; presently preferred materials include thin films of a transition metal/rare earth alloy. During read-out, the magneto-optic media is irradiated through its transparent substrate. Typically, the substrate is in the form of a disk which is adapted to be rotated about its central axis.

In reading out information recorded along nearly-concentric data tracks on a M-O disk, an optical playback head is moved radially across the disk. The playback head is usually "self-contained" in that it includes all of the components, both optical and electronic, required to produce an electrical signal representative of the recorded information. The viability of a self-contained optical head has resulted from the development of small, light-weight, and efficient laser diodes, photodetectors, and associated electronic components. But no matter how light-weight and small these components, their mass can still impose limitations on the speed and accuracy with which the head can be moved from one position to another in order access information on different data tracks. Moreover, having the laser source aboard the optical head can lead to optical alignment, thermal, and optical noise problems.

In U.S. Pat. No. 4,626,679 issued on Dec. 2, 1986 in the name of Kuwayama et al, there is disclosed a variety of optical head configurations in which a laser source and a photodetector package are optically coupled to a movably mounted lens by one or more flexible optical fibers. This "split head" arrangement allows the more bulky and heavier head components to remain stationary relative to the disk while only the objective lens used to focus the readout beam on the disk is moved relative to the disk surface. In FIG. 10 of this patent, there is disclosed a magneto-optic read-out apparatus in which read-out light emitted from a stationary laser is optically coupled to a movably mounted beam splitter and objective lens by an optical fiber. The beam splitter and objective lens move radially with respect to the disk to focus read-out light on any one of the concentric data tracks on the disk. Light reflected from the disk returns through the objective lens, strikes the beam splitter and then is redirected in a direction 90 degrees with respect to the incident light. A second optical fiber is positioned to receive the reflected light and to transmit such light toward a polarizing beam splitter which serves to separate the beam into its two polarization modes (TE and TM). A pair of photodetectors are positioned to detect the intensity of the TE and TM modes, and the respective outputs of the two photodetectors are subtracted to derive a signal representative of the Kerr rotation angle produced by the recorded information.

While the magnetic-optic playback apparatus disclosed in the above-mentioned patent affords those advantages inherent in the removal of the laser and photodetecting elements from the movable portion of the optical head, it is disadvantageous in certain respects. For example, by requiring two optical fibers, one for transmitting laser energy to the disk and another for transmitting reflected energy from the disk to the photodetectors, it presents optical alignment problems in that both fibers require precise optical alignment with collimation and condensing lenses. Moreover, the need for two fibers necessitates the use of a relatively bulky beam-splitter cube which must be mounted on the movable portion of the head to separate the incoming and reflected beams.

SUMMARY OF THE INVENTION

In view of the foregoing discussion, an object of this invention is to provide an improved magneto-optic read-out apparatus which overcomes the technical disadvantages identified above.

In accordance with the present invention, there is provided a magneto-optic read-out apparatus in which a single optical guide (e.g. a single mode optical fiber or two-dimensional waveguide) is used to optically couple a laser source and a M-O recording media as well as to optically couple the media and a pair of photodetectors which operate to provide differential detection to produce a net M-O signal. The M-O read-out apparatus comprises a light source for producing a beam of plane polarized radiation, a polarization-preserving optical guide having an input end located approximate the light source and an output end located approximate a prerecorded magneto-optic recording element, a magneto-optic polarization rotator (e.g. a conventional Faraday rotator) positioned between the output end of the optical guide and the recording element, beam-splitting means positioned between the input end of the optical guide and the light source, and a pair of photodetectors positioned to detect the output of the two beam splitters. The optical guide functions to transmit plane-polarized radiation from the source to the output end of the optical guide. An objective lens images the output end of the optical guide on the recording medium, and focuses the radiation reflected by the recording medium onto the output end of the optical guide. The Faraday rotator is designed to rotate, by 22.5 degrees, the plane of polarization of light passing from the optical guide to the recording medium; such Faraday rotator also serves to rotate, by an additional 22.5 degrees, the plane of polarization of light reflected by the recording media and imaged on the output end of the optical guide. The input end of the optical guide is aligned so that the polarized beam from the source couples entirely into one or the other of the guide's propagation modes (TE or TM). The polarization reserving character of the guide ensures that the light emitted from the output end is also perfectly polarized in the same mode The output end of the optical guide is oriented with respect to the plane of polarization of the reflective radiation passing through the Faraday rotator so that 50% of the light is coupled into each of the TE and TM modes of the optical guide, in the absence of any Kerr effect from the medium. Reflected read-out light exiting through the input end of the optical guide is directed onto the photodetectors by the two beam splitters. The beam-splitter means serves to detect light from the two propagation modes of the fiber onto the separate photodetectors. By using only one optical guide to transmit source radiation to the recording media and to transmit reflected radiation from the recording media to the photodetectors, the above-identified problems are largely eliminated.

The invention and its various advantages will become more apparent to those skilled in the art from the ensuing detailed description of the preferred embodiment, reference being made to the accompanying drawings.

DETAILED DESCRIPTION OF PREFERRED EMBODIMENTS

Figure 1:
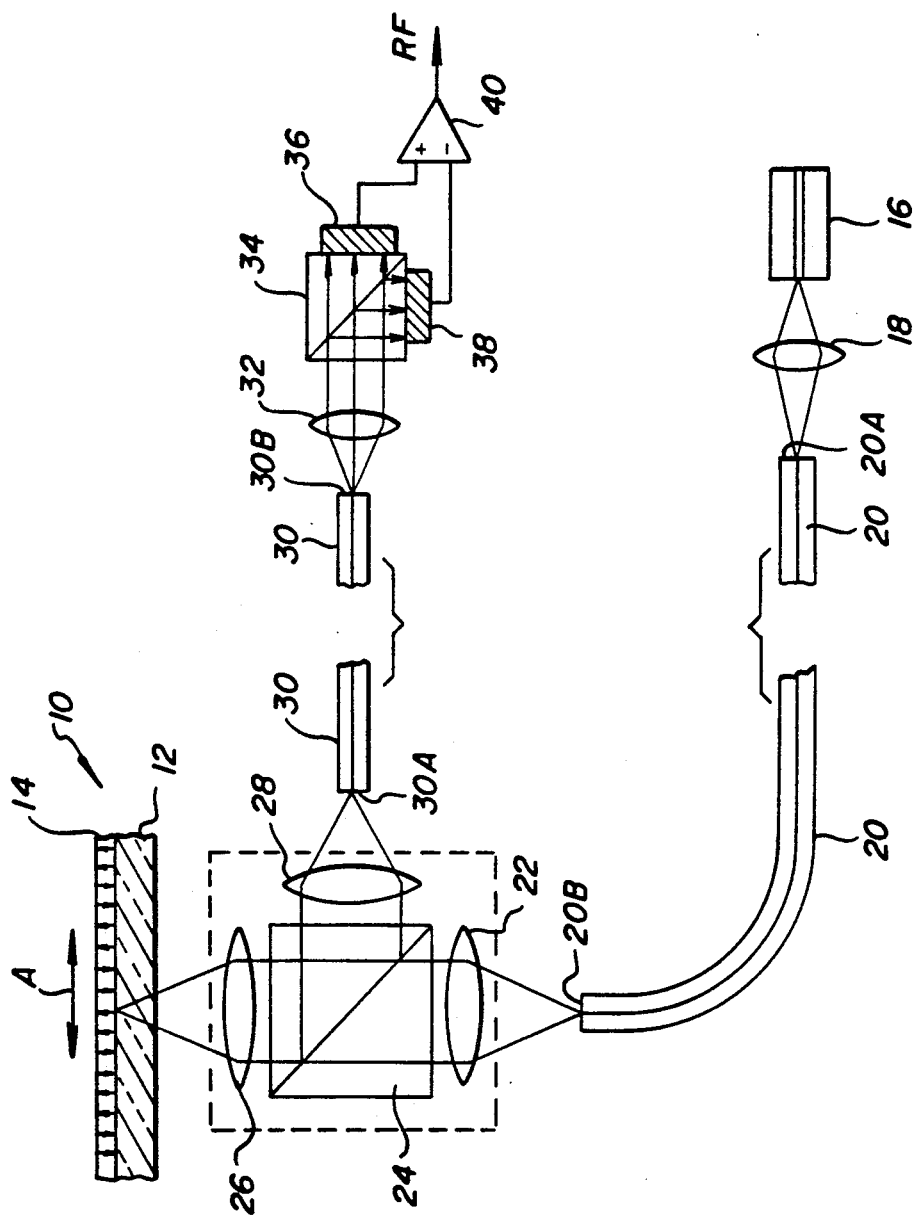
FIG. 1 schematically illustrates a magneto-optic playback head of the prior art.

Referring now to the drawings, FIG. 1 schematically illustrates a known magneto-optic playback apparatus of the type disclosed in the aforementioned U.S. Pat. No. 4,626,679. Such apparatus is designed to be utilized with a prerecorded magneto-optic recording element 10 which typically comprises a transparent disk 12 having a magnetic recording layer 14 composed of vertically oriented magnetic domains (indicated by the small arrows). The up/down orientation of these domains is representative of the recorded digital data. Owing to the magneto-optic Kerr effect, the recorded data can be read-out by scanning the recording element with a beam of plane-polarized light and monitoring the reflected beam for small angular changes (e.g., plus or minus 1 degree) in the plane of polarization. Scan irradiation of the disk with readout radiation is commonly effected by rotating the disk about its central axis while irradiating the disk at a stationary point. The radial position of such point can, of course, be varied so as to readout data from a spiral data track or any one of a plurality of concentric data tracks. Such scanning motion is indicated schematically by the arrow A.

As shown in FIG. 1, the plane-polarized beam of radiation emitted by a laser 16 is focused by a lens 18 on the input end 20A of a polarization-preserving optical fiber 20. Fiber 20 has the capability of independently transmitting therethrough two linearly (plane) polarized beams of radiation having orthogonal planes of polarization. Fiber 20 should be oriented with respect to the incident plane-polarized beam so that the beam's plane of polarization $P_B$ is aligned with either of the fiber's propagation axes $P_Y$ or $P_X$, shown in FIG. 2. Otherwise, the radiation emerging from the output end 20B of the fiber will have two orthogonal polarization components and complicate, at least, the data recovery process.

Figure 3:
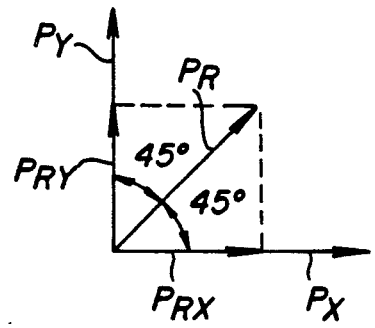

The radiation emerging from the output end 20B of fiber 20 is collimated by lens 22 and transmitted through a polarizing beam-splitter 24. An objective lens 26 operates to focus the readout radiation onto the magnetic recording layer 14 of recording element 10. Radiation reflected by the recording element is re-collimated by lens 26 and reflected by the beam-splitter in a direction perpendicular to the incident beam. A condensing lens 28 serves to focus the reflected radiation onto the input end 30A of a second polarization-preserving optical fiber 30. The input end of fiber 30 is oriented so that the fiber's orthogonal propagation modes, defined by axes $P_Y$ and $P_X$, are aligned at a 45 degree angle with respect to the plane (i.e. uneffected by the Kerr effect) of polarization $P_R$ of the reflected radiation, as shown in FIG. 3. By this arrangement, fiber 30 transmits the incident plane-polarized radiation as two orthogonal components, $P_{RY}$ and $P_{RX}$, of approximately equal amplitude.

The orthogonal components of the plane-polarized radiation emergent from the output end 30B of fiber 30 are collimated by a lens 32 and passed through a polarizing beam-splitter 34 which functions to spatially separate these polarization components. A pair of photodetectors, 36 and 38 is used to sense the respective intensities of the polarization components, and a differential amplifier 40 subtracts the respective photodetector outputs to provide an RF signal representative of the instantaneous Kerr rotation angle and the recorded data.

The optical head illustrated in FIG. 1 is of the so-called "split-head" design in that the laser source and photodetectors remain stationary during readout while only the optical components 22, 24, 26 and 28 move along the disk radius to access different data tracks. A problem associated with the design shown is that it is relatively difficult to optically align and to properly orient the components. For example, it will be appreciated that, to minimize optical losses, the output end of fiber 20 must be optically conjugate with the input end of fiber 30. This is difficult to achieve in a relatively high volume consumer product. Moreover, once optical alignment is achieved, it is particularly hard to maintain, with vibration, external forces, and temperature changes. Also, troublesome is the task of efficiently coupling the respective ends of both optical fibers to the moving and stationary lens elements in order to achieve a high signal-to-noise ratio. The need for four couplings can add significantly to the cost of manufacture.

Figure 4:
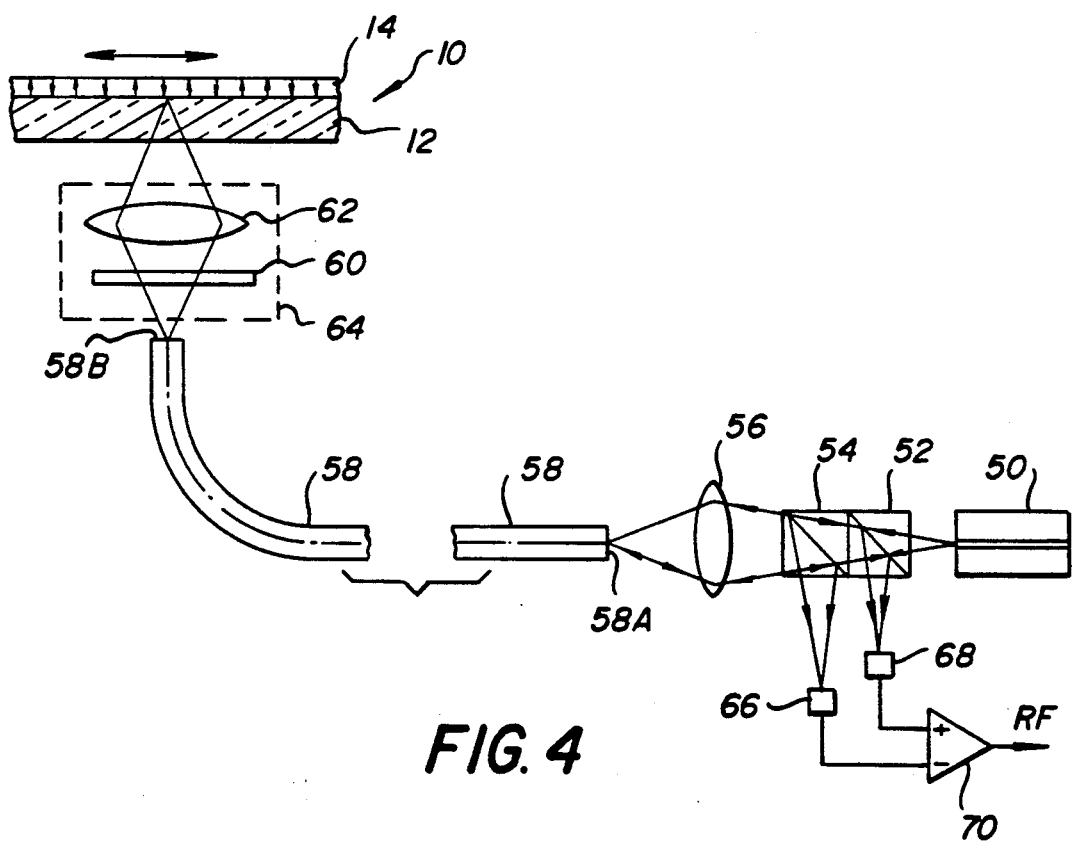
FIG. 4 schematically illustrates the magneto-optic read-out apparatus of the present invention.

Now, in accordance with the present invention, the above-noted disadvantages of the prior art apparatus are, to a major extent, alleviated by the provision of a "split-head" apparatus which employs but a single optical fiber for optically coupling the movably mounted and stationary components. Referring to FIG. 4, plane-polarized radiation emitted by a laser diode 50 passes through beam-splitters 52 and 54 and is brought to focus by a lens 56 onto the input end 58A of an optical fiber 58. Beam-splitter 52 is designed to partially transmit and partially reflect incident radiation. On the other hand, beam-splitter 54 is of the polarization type, being adapted to transmit substantially 100% of radiation polarized in a given plane, and to reflect substantially 100% of radiation in the orthogonal direction. The polarization beam-splitter is oriented to transmit substantially 100% of the plane-polarized radiation emitted from laser 50.

Figure 2:
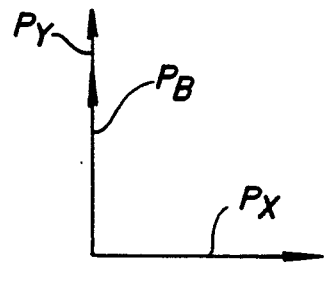
FIGS. 2 and 3 illustrate certain polarization plots which are useful in understanding the invention.

As in the case, optical fiber 58 is of the type adapted to preserve the polarization of radiation transmitted thereby and has two orthogonal propagation axes $P_Y$ and $P_X$ shown in FIG. 2. To maintain the polarization of incident plane-polarized radiation in a single plane, optical fiber 58 is oriented so that the plane of polarization of the laser output is oriented with either of its propagation axes. The plane-polarized radiation emergent from the fiber's output end 58B is passed through a polarization rotator, such as a conventional Faraday rotator 60, and brought to focus on the magnetic recording layer 14 of recording element 10 by a lens 62. The polarization rotator is designed or adjusted to rotate the plane of polarization of radiation passing therethrough by 22.5 degrees. The polarization rotator and lens 62 are the major constituents of the movable portion 64 of the readout head.

Upon reflecting from the recording element, the plane polarized readout radiation, which has already been rotated 22.5 degrees with respect to its original plane, passes back through lens 62 and rotator 60 and is brought to a focus on fiber end 58B. Having passed through the retardation plate a second time, the plane of polarization of the reflected radiation is now included at a 45 degree angle with respect to its original plane; more importantly, however, the polarization plane of the reflected radiation is now inclined at a 45 degree angle with respect to both the $P_Y$ and $P_X$ axes of optical fiber 58. As a result of this 45 degree orientation, equal amounts of the reflected, polarized radiation are transmitted equally by each propagation mode of the fiber. Also to be noted is that the point at which the read radiation exits from and re-enters the optical fiber is the optical conjugate to the focal point on the recording element; thus, there is no need to optically align these points, as in the case of the two-fiber approach of the prior art.

Upon exiting from the input end 58A of fiber 58, the reflected radiation again passes through lens 56 which now serves to concentrate the reflected radiation on photodetectors 66 and 68 via beam-splitters 54 and 52. Upon striking the polarized beam-splitter 54, one polarization component is transmitted to beam-splitter 52. As mentioned above, beam-splitter 52k is designed to reflect a portion of its incident radiation at a 90 degree angle, in this case, toward photodetectors 68. Upon being appropriately preamplified to equalize the unequal attenuation effects provided by the two beam-splitters, the respective outputs of the photodetectors are subtracted by a differential amplifier 70 to provide an RF signal representing the recorded data.

From the foregoing description it will be appreciated that a particularly advantageous M-O playback apparatus has been disclosed. Not only is such apparatus less costly to manufacture (owing to the elimination of many of the optical components of the aforementioned split-head design of the prior art), but also the apparatus of the invention is considerably easier to assemble, optically align and maintain in alignment.

The invention has been described in detail with particular reference to a preferred embodiment thereof, but it will be understood that variations can be effected within the spirit and scope of the invention.

What is claimed is:

1. Apparatus for reading-out information previously recorded on a moving Kerr effect magneto-optic recording element, said apparatus comprising:
   (a) a source of plane-polarized radiation;
   (b) a flexible polarization-preserving optical guide having an input end and an output end, said optical guide being adapted to transmit plane polarized radiation between its two ends in both of two discrete propagation modes defined by first and second transverse axes separated by 90 degrees;
   (c) a first lens positioned between said source and said input end for focusing radiation emanating from said source onto said input end, said optical guide being oriented so that either one of its transverse axes is aligned with the plane of polarization of radiation focused on said input end by said first lens;
   (d) a second lens positioned between said output end and said recording element for focusing radiation emanating from said output end onto said recording element and for focusing radiation reflected by said recording element onto said output end;
   (e) a polarization rotator plate positioned between said output end and said recording element for rotating the plane of polarization of radiation emanating from and reflected back to said output end by a total of 45 degrees, whereby the reflected and polarization-rotated radiation is converted to plane-polarized radiation which couples with approximately equal intensity into the two transmission modes of said optical guide;
   (f) beam-splitting means positioned between said first lens and said source for polarizing said radiation emanating from said source and for spatially separating said orthogonal components to produce from said reflected radiation two discrete plane-polarized beams having planes of polarization separated by 90 degrees;
   (g) photodetector means positioned in each of said spatially separated, plane polarized beams for detecting the relative intensity of said beams; and
   (h) circuit means, operatively connected to said photodetector means, for producing a signal proportional to the difference in intensities of said spatially separated, plane-polarized beams.

2. The apparatus as defined in claim 1 wherein said optical guide comprises an optical fiber.

3. The apparatus as defined in claim 1 wherein said beam-splitter means comprises first and second beam-splitter elements positioned to receive radiation reflected by said recording element and transmitted by said optical guide, at least one of said beam-splitter elements being adapted to preferentially transmit plane-polarized radiation in a first plane and to preferentially reflect plane polarized radiation in a second plane perpendicular to said first plane, and the other of said beam-splitter elements being positioned to receive plane-polarized radiation transmitted by said one beam-splitter element.

4. Apparatus for reading-out information previously recorded on a Kerr effect magneto-optic recording element, said apparatus comprising (i) scanning means including a source of plane-polarized radiation, and a lens, an optical fiber for optically coupling said source and said lens, said optical fiber having two orthogonal axes through which plane polarized radiation parallel to a first orthogonal axis is transmitted without interaction with plane polarized radiation parallel to a second orthogonal axis and means for imparting relative movement between said recording element and said lens, for scan irradiating said recording element with a focused beam of plane-polarized radiation, and (ii) photodetection means for detecting angular changes in the plane of polarization of the scan irradiating beam as produced by the information recorded on said recording element, said photodetection means comprising a pair of photodetectors, each being adapted to produce a signal proportional to incident radiation, said optical fiber transmitting reflected plane-polarized radiation between said recording element and said photodetectors and circuit means for subtracting the respective output signals of said photodetectors characterized in that (a) polarization rotator is positioned between one end of said optical fiber and said recording element, said polarization-rotation means being adapted to rotate the plane of plane-polarized radiation passing in either direction therethrough by about 22.5 degrees; and in that (b) the optical fibers comprising said scanning and photodetection means are one and the same fiber.

5. The apparatus as defined by claim 4 further characterized in that (a) said one and the same fiber is adapted to transmit plane-polarized radiation in either of two propagation modes defined by mutually perpendicular transverse axes; and (b) said fiber is oriented so that (i) one of its transverse axes is parallel to the plane of polarization of said source radiation, and (ii) said axes are inclined at a 45° angle with respect to radiation which has been twice transmitted by said polarization rotator and reflected from said recording element.

* * * * *